J. F. BURNS.
METER PROTECTIVE DEVICE.
APPLICATION FILED JAN. 19, 1916.
1,248,260.
Patented Nov. 27, 1917.
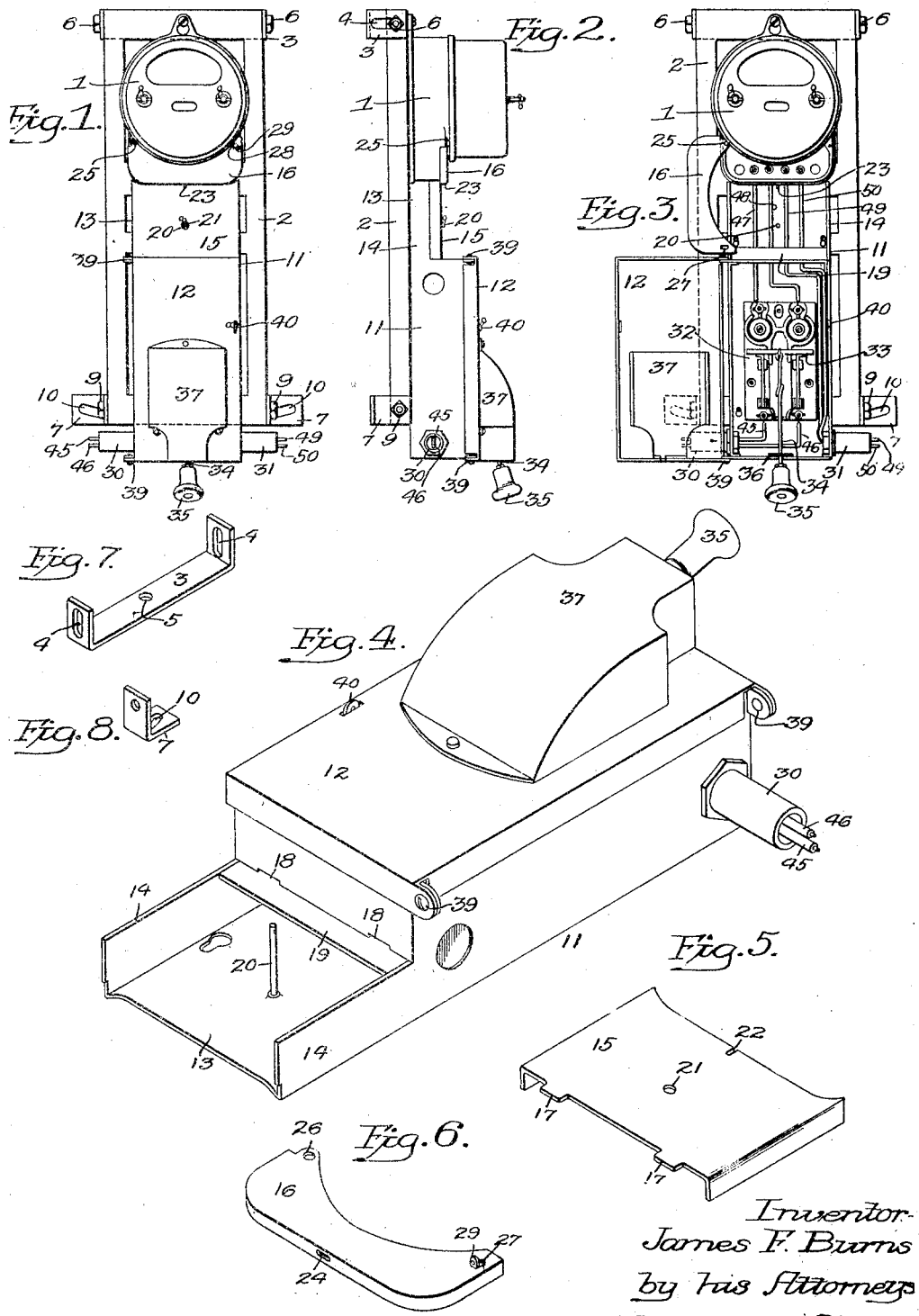
Inventor
James F. Burns
by his Attorneys
Howson & Howson

UNITED STATES PATENT OFFICE.

JAMES F. BURNS, OF PHILADELPHIA, PENNSYLVANIA.

METER PROTECTIVE DEVICE.

1,248,260.  Specification of Letters Patent.  Patented Nov. 27, 1917.

Application filed January 19, 1916. Serial No. 73,058.

*To all whom it may concern:*

Be it known that I, JAMES F. BURNS, a citizen of the United States, residing in Philadelphia, Pennsylvania, have invented Meter Protective Devices, of which the following is a specification.

One object of my invention is to provide a substantial, relatively inexpensive and convenient structure particularly designed for use in connection with watt meters such as are commonly employed in current distributing systems; whereby the meter and the current conductors leading thereto from a supply line shall be effectively protected from unauthorized exposure such as might permit theft of current or tampering with the meter, the invention contemplating the provision of an inclosure of novel construction for the reception of a switch connected between the meter and the line and so mounted as to be operative from the outside of said inclosure.

I further desire to provide a novel form of meter supporting and protecting structure of such design as to permit of the meter being properly positioned with a minimum of labor, the invention including means whereby said meter for this purpose may be adjusted in two planes at right angles to each other.

These objects and other advantageous ends I secure as hereinafter set forth, reference being had to the accompanying drawings, in which, Figures 1 and 2 are respectively a front and a side elevation illustrating my invention as constructed for supporting a well known type of watt meter, the casing for the line switch and conductors, being shown in its closed position.

Fig. 3 is a front elevation similar to Fig. 1, showing the casing open;

Fig. 4 is a perspective view of the switch box with certain of its associated parts;

Figs. 5 and 6 are perspective views of certain of the cover plates of the switch box and meter terminals respectively; and Figs. 7 and 8 are perspective views of certain of the frame supporting members forming part of my invention.

In the above drawings, 1 represents a well known form of watt meter although obviously an electrical instrument of any other type or shape might be employed without departing from my invention. This instrument is mounted upon the upper end of a vertically elongated rectangular frame 2, preferably though not necessarily formed of pressed metal and designed to be supported at its upper end upon a bracket 3, (Fig. 7) of a flattened U-shape. The two branches or arms of this bracket have each a slot 4 elongated in a line preferably lying in the plane of the bracket, and the latter has an opening 5 at the center of its cross member for the reception of a bolt whereby it may be attached to a vertical wall or other suitable supporting structure.

The frame 2 has backwardly turned flanges extending along its opposite longitudinal side and for adjustably connecting said frame to the branches of the bracket 3, I provide bolts 6 passing through the slots 4. At the opposite end of the frame 2 are a pair of angles 7 constituting feet (Fig. 8) adjustably connected to the flanges thereof by bolts 9 and each having a flange projecting in a plane parallel to that of the frame. Each of said latter flanges is provided with an elongated slot 10 substantially concentric with the hole 5 or the supporting bolt passing through the same.

Mounted on the frame 2 below the meter 1 is a casing structure 11 consisting primarily of a closed box having a hinged cover 12 and provided with an extension 13 preferably of less depth than the box, projecting between it and the lower portion of the body of the meter. It is to be noted that this extension has a bottom or back and sides 14, being designed to be closed by a removable cover plate 15 (Fig. 5) one of whose edges fits under the flange of the terminal cover plate 16 of the meter and whose opposite edge is provided with a pair of projecting lugs 17 designed to fit into openings 18 in the upper end of the switch box. This latter is preferably formed with an upwardly extending lip or flange 19 which is overlapped by the lower edge of the cover plate 15 and I mount rigidly on the back of the extension a forwardly projecting post 20 designed to pass through an opening 21 of said cover plate, the outer end of said post being perforated for the reception of the wire of a seal, The upper edge of the cover plate 15 has a notch 22 to permit of its passage below a pin 23 (Figs. 1 and 2) extending through an opening 24 in the flange of the terminal cover 16, and this latter is permanently connected to the meter case at one end by a rivet 25 which passes through an opening 26, (Fig. 6) so as to permit said cover to swing to one side sufficiently to permit of the removal of the plate 15. The opposite end of this cover plate is slotted at 27 to provide for the reception of a screw post 28 of the ordinary construction which is perforated for the reception of a seal wire designed to also pass through a perforated tongue 29 of said terminal cover adjacent its opening 27.

The switch box preferably has openings at its lower end for the reception of conduits 30 and 31 for electric conductors and it is noted that its back is closed, serving to support a combined fuse and switch block 32. The switch of said block is of the well known double pole knife type and has connected to its cross bar 33 a rod 34 terminating in a knob 35, the rod being slidable through an opening in a lug or tongue 36 projecting outwardly from the bottom of the switch box. The cover of the latter is formed with an outward extension 37 designed to permit of the full outward swing of the movable switch member when this is moved to its open position by tension exerted upon the knob 35, regardless of whether said cover is open or closed and it is noted that the lower end of the cover, as well as the lower face of said extension 37, are slotted to permit of the movement of said cover on its hinges or pivots without interference of the switch operating rod 34. The edge of the switch box cover 12 distant from the hinge pivots 39 is slotted for the passage of a tongue or lug 40 perforated for the reception of a sealing wire.

In mounting the structures above described, the bracket 3 is first bolted or screwed to a suitable vertical supporting structure, after which the bolts 6 are used to connect to it the upper end of the frame 2, upon which the meter 1 and switch box 11 have previously been rigidly mounted. The angles 7 are then rigidly connected to the lower end of the frame so that their slotted members lie flat against the vertical face of the supporting structure. Before setting up to the bolts 6, the upper end of the frame is moved toward or from the bracket 3 until the meter 1 is level, after which said bolts are tightened.

The frame 2 and its attached parts is then turned on the bolt in the hole 5 as a pivot until the meter has been brought into the desired position in a plane parallel to that of the supporting structure, after which the bolts or screws which have previously been loosely passed through the slots 10 of the bracket 7 are set up.

Suitable conduit pipes 30 and 31 are then connected to the switch box, which it will be understood is provided with a number of circular weakened portions, permitting said conduits to be entered at any of a number of different points. Current conductors 45 and 46 are then run into the box through one of the conduits and in the case illustrated, are respectively connected to one pair of the switch terminals and their conductors 47 and 48 are connected between the fuse terminals of said switch and one pair of the meter terminals. A third set of conductors 49 and 50 connected to any desired distributing system is then run into the switch box through the conduit 31 and connected to the second pair of meter terminals.

The cover plate 15 is then put in place over the extension 13 of the switch box and the terminal cover 16 is likewise swung into the position shown in Fig. 1, so that its flange preferably extends over the upper edge of said plate 15, after which the screw 28 is put in place and the wire of a seal is extended through it and through the tongue 29. A second sealing wire is then passed through the projecting end of the post 20, and after the cover 12 has been moved to its closed position, a third sealing wire is passed through the perforation in the lug 40, all of the seals then being upset or marked in the customary manner.

It is now obviously impossible for the meter terminals, the conductors, the switch or the fuses to be tampered with by unauthorized persons without disturbing the sealing wires or injuring them to such an extent as to make detection practically certain although, the switch may be opened or closed at will from outside of the switch box by force exerted upon the knob 35, it being thus possible to completely cut off the meter from the supply line. The construction above described is inexpensive to manufacture, easy to install, conveniently opened by the proper persons and of such a nature as to satisfactorily fulfil the requirements of a meter and switch protective device.

I claim:—

1. The combination of a meter; a cut-out box; a trough-like extension consisting of a back and two sides opening between said meter and the box; with a removable plate normally closing said structure and having a lug extending into the adjacent portion of the box, said meter including a removable portion normally engaging and holding in place the adjacent end of said cover.

2. The combination of a meter having a removable terminal cover; a cut-out box having an open-faced extension projecting toward said meter; with a removable cover for said extension having one end normally held in place by the terminal cover of the meter.

3. The combination with a meter having a removable terminal cover of a cut-out box having an open-faced extension between itself and said meter; with a removable cover for said extension having one end normally held in place by the terminal cover of the meter and its opposite end removably fitting into an opening of the box.

JAMES F. BURNS.